W. V. TURNER.
QUICK ACTION TRIPLE VALVE DEVICE.
APPLICATION FILED SEPT. 3, 1908.
1,031,211.
Patented July 2, 1912.
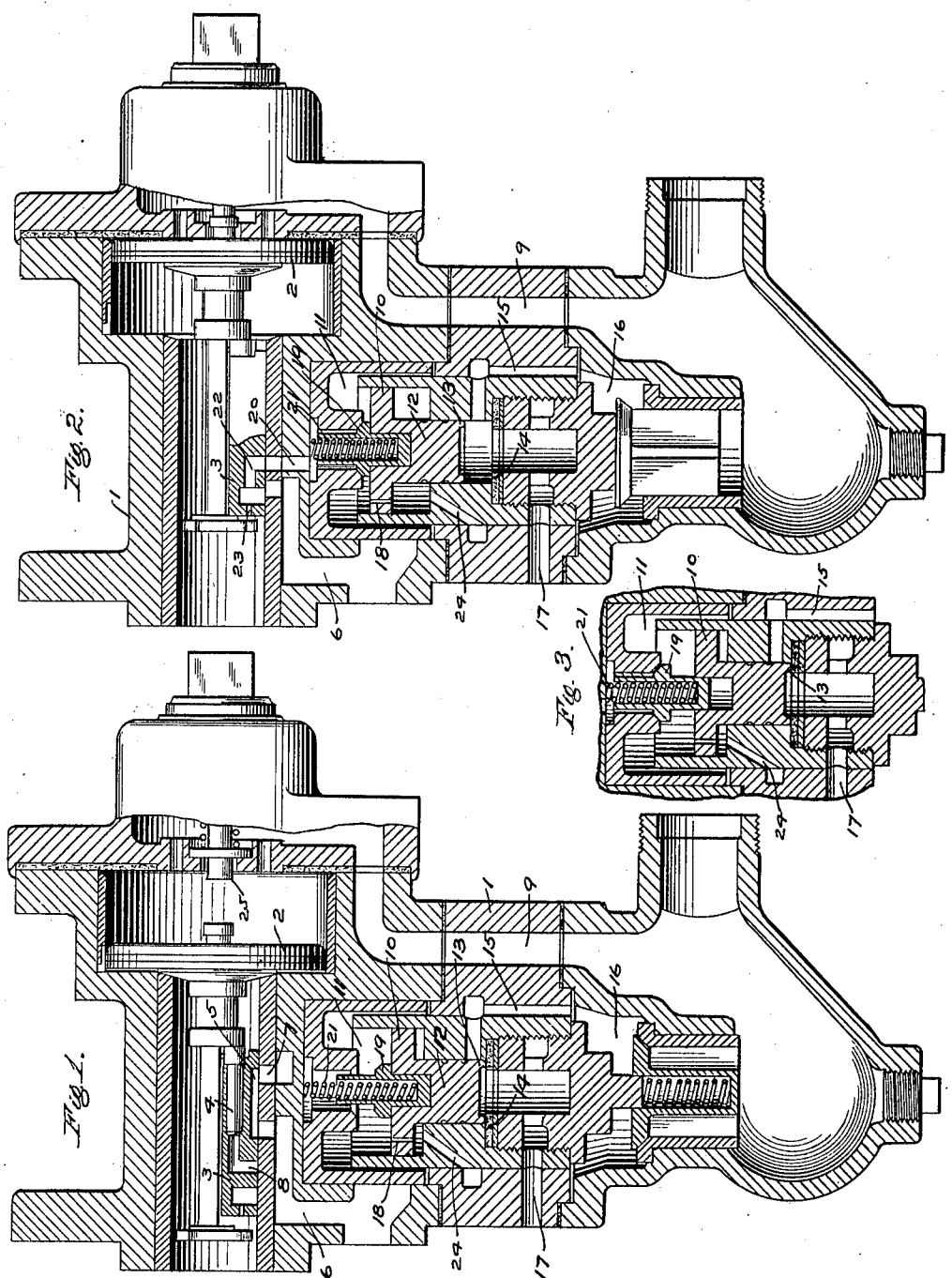
WITNESSES
INVENTOR ly equalization into either the brake cyl-
UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

QUICK-ACTION TRIPLE-VALVE DEVICE.

1,031,211.  Specification of Letters Patent.  Patented July 2, 1912.

Application filed September 3, 1908. Serial No. 451,498.

*To all whom it may concern:*

Be it known that I, WALTER V. TURNER, a citizen of the United States, residing at Edgewood, in the county of Allegheny and State of Pennsylvania, have invented new and useful Improvements in Quick-Action Triple-Valve Devices, of which the following is a specification.

This invention relates to fluid pressure brakes, and more particularly to a quick action triple valve device for securing the quick serial action of the triple valves on cars of a railway train.

With the standard quick action triple valve device at present in use, it sometimes happens that owing to a sticky triple piston or other cause the same fails to move to service position upon a service reduction in brake pipe pressure until a considerable differential of pressures exists between the auxiliary reservoir and the brake pipe and the consequence is that when the piston finally starts, it shoots clear over to the emergency position thereby producing the usual local venting of the brake pipe which then causes all the other triples in the train to go to emergency position in accordance with the well known quick serial action principle. The local brake pipe vent port remains open while the auxiliary reservoir is equalizing into the brake cylinder, so that the brake pipe pressure is greatly reduced by equalization into either the brake cylinder or with the atmosphere as the case may be. It is thus made difficult or even impossible for the engineer to check the undesired propagation of quick action throughout the train and the consequence is that severe shocks are occasioned by the emergency application of the brakes thus produced which are apt to cause damage as well as delays in the handling of trains.

One object of my invention is to provide a quick action triple valve device having means for limiting the local venting of brake pipe fluid to a predetermined amount, whereby if desired an emergency application of the brakes may be prevented.

Another object of my invention contemplates restricting the flow of air in an emergency application from the auxiliary reservoir to the brake cylinder in connection with limiting the brake pipe reduction, so that only a light gradual application of the brakes is produced should undesired quick action take place.

In the accompanying drawing, Figure 1 is a central section of a triple valve device with my improved quick action valve mechanism applied thereto and showing the parts in release position; Fig. 2 a similar view showing the parts in emergency position with vent port open; and Fig. 3 a view showing position of parts in emergency after the vent valve closes.

The triple valve illustrated comprises the usual casing 1 containing the triple valve piston 2 and the main slide valve 3 and graduating valve 4, the main slide valve being provided with exhaust cavity 5 for connecting the brake cylinder port 6 with exhaust port 7 in release position and port 8 adapted to register with brake cylinder port 6 in service application position and through which the graduating valve 4 controls the admission of air from the auxiliary reservoir to the brake cylinder in the usual well known manner.

According to a preferred form of my improvement the quick action valve mechanism comprises a piston or movable abutment 10 mounted in a piston chamber 11 and having a snugly fitting stem 12 on the end of which is provided a valve 13 adapted to engage a valve seat 14 in the casing.

The valve 13 controls communication from the brake pipe passage 15 leading from the usual check valve chamber 16 to the local vent port 17, which is shown opening to the atmosphere, though the same may communicate with the brake cylinder if desired. A passage 24 leading from the auxiliary reservoir opens to the chamber below the piston 10 and the piston is provided with an equalizing port 18 or other means to permit the pressures on opposite sides of the piston to equalize. The piston 10 also carries a valve 19 the stem of which is guided in a socket in the upper face of the piston and said valve is adapted to control communication from piston chamber 11 to a port 20 which leads to the seat of the main slide valve 3. The valve is subject to the action of a coil spring 21 which tends to move the valve away from its seat. Upon movement of the triple valve piston to the emergency position, a cavity 22 in the main slide valve connects port 20 with the brake cylinder port 6, so that the fluid under pressure in the chamber above the abutment 10 is suddenly vented to the brake cylinder. This causes the pressure on the opposite side of the abutment to shift the abutment and open the brake pipe vent valve 13 so that fluid from the brake pipe is vented to the atmospheric or other vent port 17. The movement of abutment 10 carries the valve 19 to its seat, thus cutting off the further release of air from the chamber above the abutment 10 and consequently by reason of the small volume thereof the fluid pressure quickly equalizes on opposite sides of the abutment and the same returns to the normal position by reason of the reduced pressure on the area of valve 13 exposed to atmospheric or brake cylinder pressure and seats the valve 13 thus cutting off the further venting of air from the brake pipe. But the valve 19 remains seated as shown in Fig. 3 because the pressure in the chamber 11 is at first higher than the brake cylinder pressure which acts on the opposite side of the valve and furthermore the area of the valve 19 exposed to the pressure in chamber 10 is somewhat greater than the area subject to brake cylinder pressure. However, the brake cylinder pressure is finally increased by flow from the auxiliary reservoir to a point substantially equal to the pressure in the chamber 11 and thereupon the spring 21 operates to return the valve 19 to the normal position shown in Fig. 1. It will be evident that by regulating the size of the equalizing port 18, the movement of the abutment may be timed so as to give any desired degree of reduction in brake pipe pressure.

In the emergency position of the triple valve the port 23 in the main slide valve which admits air from the auxiliary reservoir to the brake cylinder is of such size as to restrict the flow of air from the auxiliary reservoir to the brake cylinder and this is an important feature of my invention in connection with the means for limiting the brake pipe reduction for if it should happen that a triple valve is shifted to emergency position when such action is not intended or if it is desired to check an emergency application at any time it will be seen that the restricted flow of air to the brake cylinder from the auxiliary reservoir produces a slow and gradual increase in the brake cylinder pressure and consequently the injurious as well as disagreeable effects of a sudden heavy application of the brakes is avoided.

Though the local venting of the brake pipe is sufficient to cause quick serial action of the triple valves throughout the train, as the reduction in pressure is limited to a predetermined amount, the triple pistons will be automatically returned from emergency position by the action of the spring stem 25 so as to lap the emergency brake cylinder port as soon as the flow of air from the auxiliary reservoir to the brake cylinder reduces the auxiliary reservoir pressure to slightly less than the reduced pressure existing in the brake pipe. It will also be noted that as the local brake pipe vent ports are automatically closed upon the predetermined reduction in brake pipe pressure, the engineer is enabled to readily control the brakes by means of the engineer's brake valve, by varying the brake pipe pressure in the usual manner.

From the foregoing description it will also be evident that my improvement may be employed for the purpose of accelerating the action of the triple valves in service applications of the brakes, by first turning the brake valve to emergency position and then back to lap, after having made a sufficient reduction in train pipe pressure to effect the desired quick serial movement of the triple valves. If an emergency application of the brakes is desired, the brake valve is turned to emergency position and allowed to remain there.

Having now described my invention, what I claim as new and desire to secure by Letters Patent, is:—

1. In a fluid pressure brake, the combination with a train pipe, of a valve for venting fluid from the train pipe, a movable abutment normally subject on opposite sides to fluid pressure for operating said valve, means operating upon a reduction in train pipe pressure for opening a communication for venting fluid from one side of said abutment to thereby open the train pipe vent valve, a valve for closing said communication, and means for equalizing the fluid pressures on opposite sides of said abutment to effect the closure of said train pipe vent valve.

2. In a fluid pressure brake, the combination with a train pipe, of a valve for venting fluid from the train pipe, a movable abutment normally subject on opposite sides to fluid pressure for operating said valve, means operating upon a reduction in train pipe pressure for opening a communication for venting fluid from one side of said abutment to thereby open the train pipe vent valve, a valve operated by said abutment for fully closing said communication, and means for equalizing the fluid pressure on opposite sides of said abutment to effect the closure of said train pipe vent valve.

3. In a fluid pressure brake, the combination with a triple valve device, of valve means for controlling a brake pipe vent port, an actuating abutment therefor normally subject on one side to fluid pressure and having means for equalizing the pressures on opposite sides thereof, means operated by a reduction in brake pipe pressure for opening a release port to one side of said abutment for opening the brake pipe vent port, and means operating upon movement of said abutment for closing said release port to permit equalization of pressures and thereby close said brake pipe vent port independently of the equalization of the auxiliary reservoir into the brake cylinder.

4. In a fluid pressure brake, the combination with a train pipe, of a valve for venting fluid from the train pipe, a movable abutment normally subject on opposite sides to fluid pressure for operating said valve, means operating upon a reduction in train pipe pressure for opening a communication for venting fluid from one side of said abutment to thereby open the train pipe vent valve, a valve operated by said abutment for fully closing said communication, and means for equalizing the fluid pressure on opposite sides of said abutment to effect the closure of said train pipe vent valve, said closing valve being adapted upon equalization of the auxiliary reservoir into the brake cylinder to return to its normal open position.

5. In a fluid pressure brake, the combination with a triple valve device, of a valve for controlling a local brake pipe vent port, an actuating abutment therefor normally subject on one side to fluid under pressure and having an equalizing port adapted to permit equalization of fluid pressure into the chamber at the opposite side of said abutment, the movement of the triple valve device to emergency position being adapted to open a communication for venting air from said chamber and thereby operate the abutment to open the brake pipe vent port, and a valve operated upon movement of said abutment for fully closing said communication to permit the rapid equalization of fluid pressure into said chamber, thereby actuating the abutment to close the brake pipe vent port.

6. In a fluid pressure brake, the combination with a triple valve device, having a main valve provided with a restricted port for limiting the flow of air to the brake cylinder in emergency applications, of a valve mechanism operating upon a reduction in brake pipe pressure for opening a brake pipe vent port and means for limiting the reduction in brake pipe pressure through the vent port to a predetermined amount.

7. The combination with a quick action triple valve device having a main slide valve and operating to open a local brake pipe vent port in emergency position, of means for limiting the venting of air from the brake pipe to a predetermined degree, said main valve having a restricted port for limiting the flow of air from the auxiliary reservoir to the brake cylinder.

8. In a fluid pressure brake, the combination with a triple valve device and a train pipe, of a valve for venting fluid from the train pipe, a movable abutment normally subject on opposite sides to fluid pressure for actuating said valve, said triple valve device having a port adapted in emergency position to connect one side of said abutment with the brake cylinder, and a valve operated by said abutment for closing said port.

9. In a fluid pressure brake, the combination with a triple valve device and a train pipe, of a valve for venting fluid from the train pipe, a movable abutment normally subject on opposite sides to fluid pressure for actuating said valve, said triple valve device operating upon a reduction in train pipe pressure to open a port for connecting one side of said abutment with the brake cylinder, and a valve operated by said abutment for closing said communication.

In testimony whereof I have hereunto set my hand.

WALTER V. TURNER.

Witnesses:
Wm. M. Cady,
A. M. Clements.

---

Copies of this patent may be obtained for five cents each, by addressing the "Commissioner of Patents, Washington, D. C."